United States Patent [19]

McMaster

[11] 4,363,163

[45] Dec. 14, 1982

[54] QUENCH ROLL INCLUDING HELICALLY WRAPPED SUPPORT

[76] Inventor: Harold A. McMaster, 707 Riverside Dr., Woodville, Ohio 43469

[21] Appl. No.: 206,405

[22] Filed: Nov. 13, 1980

[51] Int. Cl.³ ...................... B21B 27/02; C03B 35/18
[52] U.S. Cl. ......................................... 29/127; 65/351
[58] Field of Search .................... 29/127, 128; 65/119, 65/118, 351; 432/244

[56] References Cited

U.S. PATENT DOCUMENTS

| 2,464,040 | 3/1949 | Huebner | 29/127 X |
|---|---|---|---|
| 3,672,861 | 6/1972 | Ritter et al. | 65/114 X |
| 4,084,806 | 4/1978 | Wenthe et al. | 29/127 X |
| 4,230,475 | 10/1980 | Dunk | 65/118 |
| 4,300,937 | 11/1981 | Rhonehouse | 65/351 X |

FOREIGN PATENT DOCUMENTS

| 481697 | 4/1975 | Australia | 65/351 |
|---|---|---|---|
| 554022 | 6/1923 | France | 65/118 |

*Primary Examiner*—Eugene F. Desmond

*Attorney, Agent, or Firm*—Reising, Ethington, Barnard, Perry & Brooks

[57] ABSTRACT

A quench roll (20) for a glass sheet tempering system of the roller conveyor type includes a helical support (44) with a construction that does not mark conveyed glass sheets but which is nevertheless capable of withstanding breaking of glass sheets without being cut so as to require repair. The helical support (44) is wrapped about a shaft (42) of the roll (20) and includes a core (46) as well as a nonmetallic outer covering (50). The outer covering (50) is preferably a synthetic organic polymer such as silicone rubber or Teflon and, for best results, the covering has an outer sleeve (50a) of ceramic fibers. The core (46) is preferably metallic and made of wire strands (52) that facilitate wrapping thereof in the helical configuration. Spring end connections (54) disclosed prevent unwinding of the helical support (44) during glass sheet conveyance. The helical support (44) has particular utility with frictionally driven quench rolls and preferably has an outer diameter equal to the diameter of friction drive surfaces (78) of the roll.

17 Claims, 7 Drawing Figures

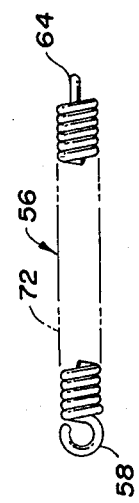
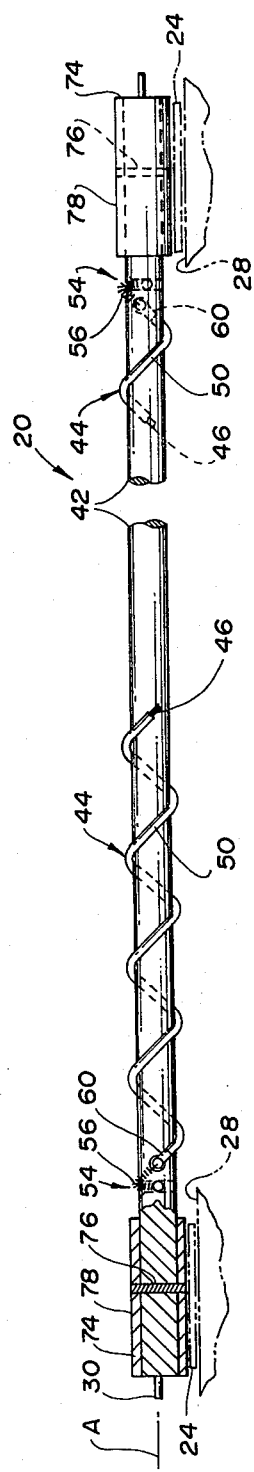
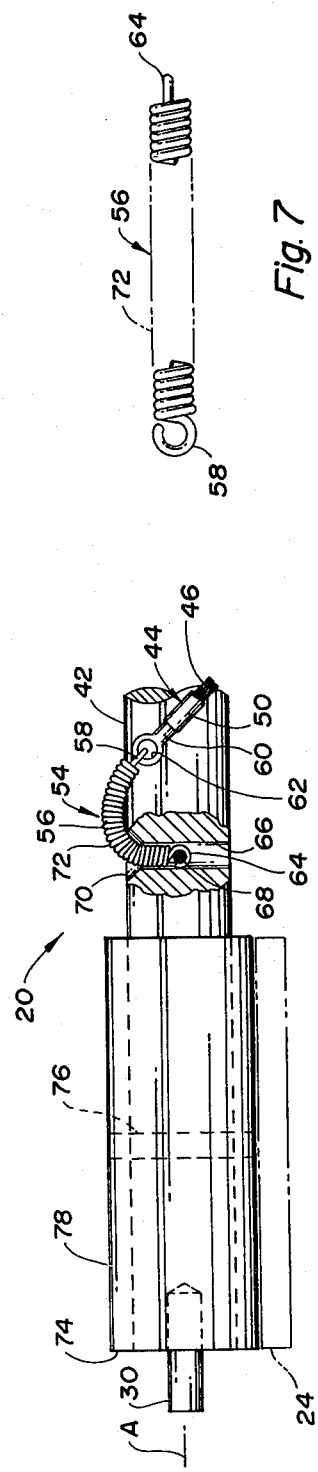

QUENCH ROLL INCLUDING HELICALLY WRAPPED SUPPORT

TECHNICAL FIELD

This invention relates generally to glass sheet tempering systems of the horizontal roller conveyor type and, more particularly, to a quench roll for conveying heated glass sheets through a quench unit of the system.

BACKGROUND ART

U.S. Pat. Nos. 3,806,312; 3,934,970; 3,947,242; and 3,994,711 disclose glass tempering systems of the horizontal roller conveyor type for conveying glass sheets in a horizontal direction during a tempering process. Rolls in both the furnace and quench unit of each of the tempering systems disclosed by these patents are supported at their opposite ends and frictionally driven by continuous drive loops. Glass sheets supported on the upper sides of the rolls are conveyed therealong first through the furnace where heating takes place and then through the quench unit where quench gas supplied by upper and lower blastheads provides rapid cooling of the heated glass to perform the tempering.

One conventional type of quench roll for horizontal roller conveyor type systems for tempering glass sheets includes a central steel shaft and a flexible metallic component embodied by all metal wire or a helical spring wrapped about the shaft in a helical configuration so as to reduce the area of contact between the roll and the lower surface of a glass sheet supported on the roll. Such helical metallic components increase the lower glass sheet surface area subjected to quenching gas and thereby increase the degree to which the tempering is performed. In addition, the helical metallic components prevent lifting of conveyed glass sheets by facilitating the escape of spent quenching gas downwardly after impinging with the lower glass surface. Since the metallic components remain rigid at the temperature involved, the softened glass sheet can be marked by the more rigid helical metallic component if all of the furnace, quench unit, and conveying parameters are not properly selected.

Other types of quench rolls for horizontal roller conveyor type systems for tempering glass sheets include annular silicone rubber members received by a central steel shaft and asbestos rope wrapped helically around a central shaft. The major problem with these types of quench rolls is that the occassional glass sheet that breaks upon quenching cuts the annular silicone rubber member or the asbestos rope and the roll must then be repaired before further use.

Quench rolls for tempering relatively wide glass sheets have also included a central shaft along which glass fiber conveying discs are positioned to carry the glass during tempering. Such a quench roll construction increases the escape area for spent quenching gas supplied by a lower blasthead.

DISCLOSURE OF INVENTION

An object of the present invention is to provide a glass sheet quench roll that does not mark glass sheets during quenching but which is nevertheless capable of withstanding breaking of glass sheets without requiring repair.

In carrying out the above object and other objects of the present invention, a quench roll for a roller conveyor type glass sheet tempering system includes an elongated support that is wrapped about an elongated shaft of the roll in a helical configuration and which includes a core having opposite ends secured to the shaft and an outer nonmetallic covering that is stable at a sufficiently high temperature so as to be capable of supporting a hot glass sheet during quenching. Upon driving of the shaft about a rotational axis thereof transverse to the direction of glass sheet conveyance through the quench unit, the nonmetallic covering supports the glass sheet without marking its lower surface while the core of the support provides a reinforcement so as to be capable of withstanding glass breakage.

The outer covering of the helical support is preferably a synthetic organic polymer and, as disclosed, is silicone rubber. Another synthetic organic polymer that can be used for the outer covering of the helical support is Teflon. In addition, other nonmetallic materials which are capable of withstanding temperatures on the order of about 500° F. without marking the glass can also be utilized.

Best results are achieved with the helical support covering having an outer sleeve of ceramic fibers for supporting the conveyed glass sheets. However, the helical support also functions adequately for many job runs after the ceramic fiber sleeve unbraids and exposes the synthetic organic polymeric material of the covering.

The core of the helical support is preferably a metallic material so as to provide a reinforcement that will not be cut by broken glass in the quench. However, it is also possible to utilize glass fibers or any other material with the necessary resistance to cutting by broken glass and the ability to withstand the high temperature involved. As disclosed, the metallic core is made from metal strands such as copper, aluminum, or steel, etc. The metal strands give the support a flexible characteristic so as to facilitate wrapping of the support in its helical configuration about the elongated shaft of the quench roll.

At least one spring connection is preferably provided to secure one of the ends of the core to the shaft so as to tension the core and thereby maintain the position of the helical support on the shaft during glass conveyance in a forward direction within the quench unit. If an oscillating type of conveyance is to be utilized within the quench unit, a pair of the spring connections are utilized to respectively secure both ends of the core to the shaft so as to tension the core and thereby maintain the position of the helical support on the shaft during glass sheet conveyance in both directions. The spring connection utilized includes a helical tension spring having one end attached to a connector secured to the associated end of the core and another end secured within an associated hole in the shaft. The shaft hole has an outer flared end at which an intermediate portion of the helical tension spring bends without projecting radially beyond the outer diameter defined by the helical configuration of the support.

A quench roll with a helical support constructed in accordance with the present invention has particular utility with quench rolls of the frictionally driven type having opposite ends including round friction drive surfaces of the same diameter as each other. An intermediate portion of the shaft has a round cross section with a smaller diameter than the end drive surfaces and the helical support is wrapped therearound extending between the drive surfaces. Most preferably, the helical configuration of the support has an outer diameter equal to the diameter of the friction drive surfaces such that the glass sheets are conveyed at the same speed as continuous drive loops utilized to rotatively drive the quench roll.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 5 is a view of the quench roll taken along line 4—4 of FIG. 1 and illustrating the support wrapped in its helical configuration about a shaft of the roll;

FIG. 6 is an enlarged view of an end of the quench roll illustrating a spring connection that secures the helical support to the shaft of the roll; and FIG. 7 is a view illustrating a tension spring of the connection shown in FIG. 6.

BEST MODE FOR CARRYING OUT THE INVENTION

Figure 1:
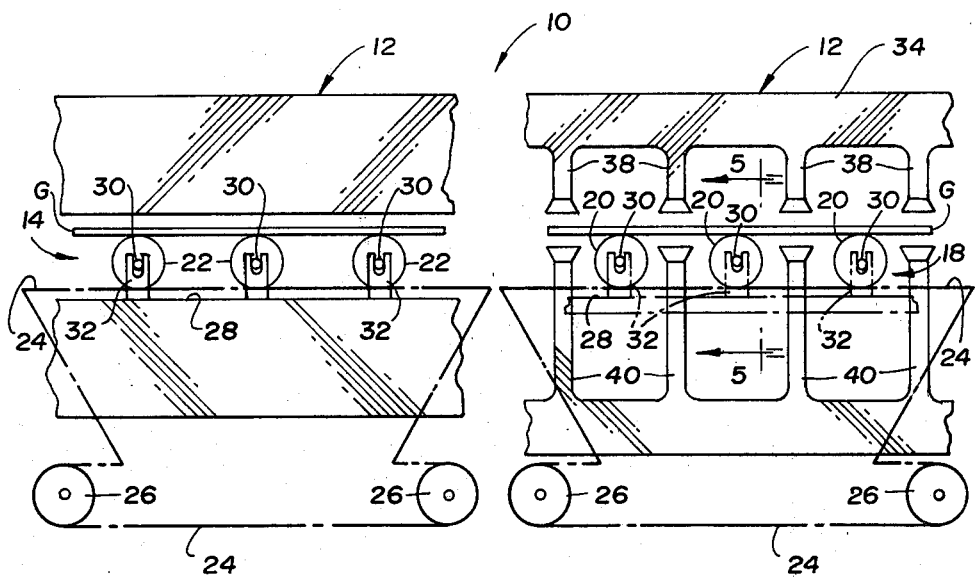
FIG. 1 is a schematic side elevation view of a glass sheet tempering system whose quench unit includes quench rolls that are constructed in accordance with the present invention.

Referring to FIG. 1 of the drawings, a glass sheet tempering system collectively indicated by reference numeral 10 includes a furnace 12 in which sheets of glass G are heated while conveyed on a roller conveyor 14, and the system also includes a gas quench unit 16 for quenching the heated glass sheets G to provide tempering thereof while conveyed on a roller conveyor 18. As will be more fully hereinafter described, each quench roll 20 of the quench unit conveyor 18 is constructed in accordance with the present invention.

Furnace conveyor 14 and quench unit conveyor 18 illustrated in FIG. 1 are generally of the type disclosed by U.S. Pat. Nos. 3,806,312; 3,934,970, 3,947,242; and 3,994,711 wherein a pair of continuous drive loops frictionally drive each conveyor. Furnace conveyor 14 includes rolls 22 whose opposite ends are respectively supported by driving reaches of a pair of continuous drive loops 24 (only one of which is shown) that are each drivingly supported by an associated pair of rotatable sheaves 26. Driving rotation of the left sheave 26 in a counterclockwise direction slidably drives the driving reach of the continuous drive loop 24 over an associated horizontal support surface 28 to frictionally drive the rolls 22 in a clockwise direction and thereby convey the glass sheet G toward the right. End pins 30 of the rolls 22 are rotatably captured within upwardly opening slots in positioners 32 mounted on the support surface 28 in order to prevent movement of the rolls toward the left or the right such that the drive loop movement imparts only rotational movement to the rolls. The driving reaches of the drive loops 24 are maintained taut such that the rolls 22 are positioned with their upper sides in a single plane in order to maintain planarity of the conveyed glass sheet G. This taut condition of the rolls can be provided by either biasing the rotational support of the right idler sheave 26 away from the left drive sheave 26 or by providing a clockwise counter-torque to the right sheave in order to pull the right end of the driving reach toward the right. Also, the furnace conveyor 14 can be driven in an oscillating manner as disclosed by the aforementioned U.S. Pat. No. 3,994,711 if desired for the particular system.

With continuing reference to FIG. 1, the quench unit 16 includes upper and lower blastheads 34 and 36 between which the roller conveyor 18 conveys a heated sheet of glass G to be tempered. Banks of nozzles 38 of the upper blasthead 34 and banks of nozzles 40 of the lower blasthead 36 respectively supply quenching gas to the upper and lower surfaces of the glass sheet G in order to provide the rapid cooling thereof which tempers the glass. Quench unit conveyor 18 includes a friction drive mechanism similar to the furnace conveyor 14 and, as such, the like components thereof are identified by like reference numerals. Quench rolls 20 are supported and frictionally driven by the associated pair of continuous drive loops 24 of the quench unit conveyor such that the heated glass sheet G supported on the upper sides of these rolls is conveyed between the quench unit nozzles 38 and 40 for tempering.

Referring to FIG. 5, a quench roll 20 constructed in accordance with the present invention includes an elongated shaft 42 that extends transversely to the direction of conveyance through the quench unit and has a rotational axis A about which the roll rotates during driving thereof by the associated pair of drive loops 24 in order to convey a glass sheet supported on the roll. An elongated support 44 of the roll is wrapped about the shaft 42 in a helical configuration so as to support glass sheets conveyed by a roll during use. As seen by additional reference to FIGS. 2 and 3, the support 44 includes a core 46 having opposite ends 48 which are secured to the roll shaft upon assembly to maintain the support in its helical configuration. The support also has an outer covering 50 of a nonmetallic material that is stable at a sufficiently high temperature so as to be capable of conveying a hot glass sheet on the shaft upon cooling thereof at the quench unit to provide the tempering.

Covering 50 is preferably made from a synthetic organic polymer so as not to mark heated glass sheets in their softened condition upon conveyance at the beginning of the quenching operation. Silicone rubber is one organic polymer that can withstand the temperature involved without marking the glass sheets. Another organic polymer which can be utilized for the covering 50 is Teflon. Likewise, any other nonmetallic material that will not mark heated glass sheets and which has the ability to withstand temperatures on the order of about 500° F. can be utilized for the covering although the two organic polymers mentioned are preferred. It should be mentioned that, while the glass sheets are at a temperature of about 1150° to 1200° F., the covering 50 does not have to be able to withstand that high of a temperature since the quench gas provides a gas film between the support covering and the conveyed glass sheet. Also, the support of the glass sheet by each portion of the covering 50 is only mementary and the quenching gas thereafter provides cooling.

Figure 4:
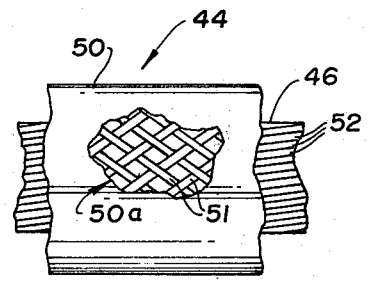
FIG. 4 is an enlarged partial view taken in the same direction as FIG. 2 and illustrating an outer sleeve of the covering for the helical support.

With reference to FIG. 4, best results are achieved when the covering 50 of the helical support includes an outer sleeve 50a of braided ceramic fibers 51. The outer sleeve 50a tends to become unbraided after a certain amount of use and exposes the covering 50 of the synthetic organic polymer. Since commercially available insulated electrical wire has the preferred core, covering, and outer sleeve construction used, the helical support 44 can be replaced without great cost when the outer sleeve 50a wears out. If the requirements of the particular job run can be met, the helical support 44 can be used without the outer sleeve 50a of ceramic fibers after the fibers become unbraided.

The core 46 of the support is preferably made from a metallic material although it is also possible to utilize other materials, such as glass fibers, which can withstand the high temperature and which are resistant to cutting when glass breaks within the quench unit. The metal core 46 preferably includes metal strands 52 such that the core is relatively flexible in order to facilitate wrapping thereof in its helical configuration about the roll shaft. Any suitable metal such as copper, aluminum, or steel, etc. can be utilized for the metal strands.

The quench unit 16 illustrated in FIG. 1 is of the oscillated type wherein the glass sheet G is conveyed to the right and left during the tempering in order to distribute the quenching flow of the gas supplied through the banks of nozzles 38 and 40. During conveyance in each direction, the helical support 44 shown in FIG. 5 is urged by the glass axially in a corresponding direction along the shaft in a manner that tends to unwind the support. A pair of spring connections 54 secure the opposite ends of the suport core 46 to the shaft 42 and tension the core in a manner which maintains the helical support in position on the shaft without unwinding due to the axial force applied thereto by the conveyed glass. The left spring connection 54 pulls on the helical support 44 to prevent unwinding thereof during forward conveyance, toward the right as viewed in FIG. 1, while the right connection 54 pulls on the helical support to prevent unwinding thereof during conveyance in the opposite direction. A single spring connection 54 can be utilized if the quench unit is of the "continuous" type wherein glass sheets are conveyed in a single forward direction during the tempering.

Figure 2:
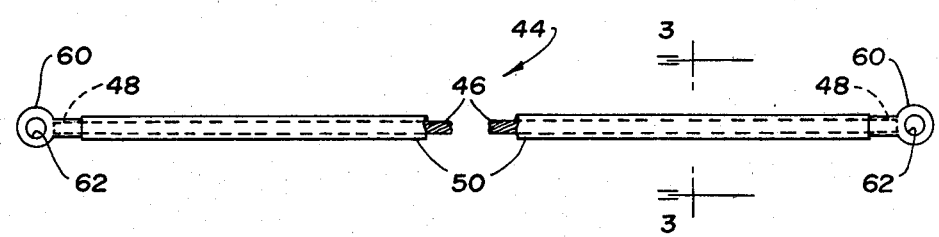
FIG. 2 is a view illustrating an elongated support that is wrapped about a shaft of the quench roll in a helical configuration upon attachment to support glass sheets during tempering.
Figure 3:
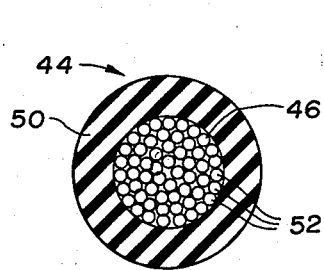
FIG. 3 is a cross-sectional view taken along line 3—3 of FIG. 2 to illustrate the construction of the glass sheet support.

As illustrated in FIGS. 6 and 7, the spring connections 54 each include a helical tension spring 56. A first end 58 of the tension spring 56 is attached to a connector 60 which, as seen in FIG. 2, is secured to the adjacent end 48 of the support core 46 by a weld or soldering operation. An opening 62 of the connector 60 receives a hook shape of the first spring end 58 in order to provide attachment thereof to the support. A second end 64 of the spring 56 is received within a hole 66 in the shaft 42 and has a hook shape through which a threaded retainer 68 extends. A threaded bore transverse to the hole 66 receives the retainer 68 in order to permit attachment and detachment of the spring. Hole 66 has an outer flared end 70 at which an intermediate portion 72 of the spring 56 bends such that the spring does not extend radially with respect to the rotational axis A beyond the outer diameter defined by the helical configuration of the support 44.

As seen in FIG. 5, opposite ends of the shaft 42 include annular drive members 74 that are fixed to the shaft by associated retainer pins 76. Each drive member 74 has a round friction drive surface 78 of the same diameter as the other drive member and of a larger diameter than the intermediate portion of the shaft 42 which has a round cross section between the drive members. Preferably, the diameter of the friction drive surfaces 78 is equal to the outer diameter of the helical configuration defined by the support 44 such that glass sheets are conveyed on the helical support at the same rate as the drive loops 24 are driven in order to rotate the rolls. Thus, the cross sectional diameter of the elongated support 44 is equal to one-half the difference between the diameters of the drive members surfaces 78 and the outer surface of shaft 42. Also, the diameter of the helical spring 56 between its ends is preferably equal to the cross sectional diameter of the support 44 such that the spring will also support the edge of any relatively wide glass sheet whih is being conveyed.

While the best mode for carrying out the invention has herein been described in detail, those familiar with the art to which this invention relates will recognize various alternative designs and embodiments for carrying out the invention as defined by the following claims.

What is claimed is:

1. A quench roll for a quench unit of a roller conveyor type system for tempering glass sheets, said quench roll comprising: an elongated shaft that extends transversely to the direction of conveyance through the quench unit and which has a rotational axis so as to convey glass sheets supported by the shaft upon driving thereof about said rotational axis; an elongated support that is wrapped about the shaft in a helical configuration; said support including a core having opposite ends that are secured to the shaft; and the support having an outer covering of a nonmetallic material that is stable at a sufficiently high temperature so as to be capable of supporting a hot glass sheet on the shaft upon cooling thereof at the quench unit.

2. A quench roll as in claim 1 wherein the outer covering of the helical support comprises a synthetic organic polymer.

3. A quench roll as in claim 2 wherein the organic polymer comprises silicone rubber.

4. A quench roll as in claim 2 wherein the organic polymer comprises Teflon.

5. A quench roll as in claim 1, 3, or 4 wherein the covering further includes an outer sleeve of ceramic fibers.

6. A quench roll as in claim 1 wherein the core of the support is a metallic material.

7. A quench roll as in claim 6 wherein the metallic core of the support includes metal strands such that the core is relatively flexible in order to facilitate wrapping thereof in the helical configuration about the shaft.

8. A quench roll as in claim 1 including at least one spring connection for securing one of the ends of the core to the shaft so as to tension the core and thereby maintain the position of the helical support on the shaft during glass sheet conveyance in one direction within the quench unit.

9. A quench roll as in claim 1 which includes a pair of spring connections for respectively securing the opposite ends of the core to the shaft so as to tension the core and thereby maintain the position of the helical support on the shaft during glass sheet conveyance in opposite directions within the quench unit.

10. A quench roll as in claim 8 or 9 wherein each spring connection includes a helical tension spring having one end connected to the associated end of the core, the shaft having a hole in which the other end of the helical tension spring is secured, and the hole having an outer flared end at which an intermediate portion of the helical tension spring bends without projecting radially beyond the outer diameter defined by the helical configuration of the support.

11. A quench roll for a quench unit of a roller conveyor type system for tempering glass sheets, said quench roll comprising: an elongated shaft that extends transversely to the direction of conveyance through the quench unit and which has a rotational axis so as to convey glass sheets supported by the shaft upon driving thereof about said rotational axis; an elongated support that is wrapped about the shaft in a helical configuration; said support including a metallic core having opposite ends that are secured to the shaft; and the support having an outer covering of a synthetic organic polymer that is stable at a sufficiently high temperature so as to be capable of supporting a hot glass sheet on the shaft upon cooling thereof at the quench unit.

12. A quench roll for a quench unit of a roller conveyor type system for tempering glass sheets, said quench roll comprising: an elongated shaft that extends transversely to the direction of conveyance through the quench unit and which has a rotational axis so as to convey glass sheets supported by the shaft upon driving thereof about said rotational axis; said shaft having opposite ends including round friction drive surfaces of the same diameter as each other; said shaft also having an intermediate portion of a round cross section with a smaller diameter than the end drive surfaces; an elongated support that is wrapped about the intermediate portion of the shaft in a helical configuration; said support including a core having opposite ends that are secured to the shaft; and the support having an outer covering of a nonmetallic material that is stable at a sufficiently high temperature so as to be capable of supporting a hot glass sheet on the shaft upon cooling thereof at the quench unit.

13. A quench roll as in claim 12 wherein the helical configuration of the support has an outer diameter equal to the diameter of the friction drive surfaces.

14. A quench roll for a quench unit of a roller conveyor type system for tempering glass sheets, said quench roll comprising: an elongated shaft that extends transversely to the direction of conveyance through the quench unit and which has a rotational axis so as to convey glass sheets supported by the shaft upon driving thereof about said rotational axis; an elongated support that is wrapped about the shaft in a helical configuration; said support including a metallic core having opposite ends; a pair of connections that respectively secure the opposite ends of the core to the shaft; at least one of the connections including a helical tension spring that tensions the core; and the support having an outer covering of a synthetic organic polymer that is stable at a sufficiently high temperature so as to be capable of supporting a hot glass sheet on the shaft upon cooling thereof at the quench unit.

15. A quench roll for a quench unit of a roller conveyor type system for tempering glass sheets, said quench roll comprising: an elongated shaft that extends transversely to the direction of conveyance through the quench unit and which has a rotational axis so as to convey glass sheets supported by the shaft upon driving thereof about said rotational axis; said shaft having opposite ends including round friction drive surfaces of the same diameter as each other; said shaft also having an intermediate portion of a round cross section with a smaller diameter than the end drive surfaces; an elongated support that is wrapped about the intermediate portion of the shaft in a helical configuration; said support including a metallic core having opposite ends; a pair of connections for respectively securing the opposite ends of the metallic core to the shaft; at least one of said connections including a helical tension spring having one end connected to the associated end of the core and another end secured to the shaft such that the core is tensioned in its helical configuration about the shaft; the support having an outer covering of a synthetic organic polymer that is stable at a sufficiently high temperature so as to be capable of supporting a hot glass sheet on the shaft upon cooling thereof at the quench unit; and the helical configuration of the support having an outer diameter equal to the diameter of the friction drive surfaces.

16. A quench roll for a quench unit of a roller conveyor type system for tempering glass sheets, said quench roll comprising: an elongated shaft that extends transversely to the direction of conveyance through the quench unit and which has a rotational axis so as to convey glass sheets supported by the shaft upon driving thereof about said rotational axis; said shaft having opposite ends including round friction drive surfaces of the same diameter as each other; said shaft also having an intermediate portion of a round cross section with a smaller diameter than the end drive surfaces; an elongated support that is wrapped about the intermediate portion of the shaft in a helical configuration; said support including a metallic core of metal strands; a pair of connectors respectively secured to opposite ends of the core; a pair of spring connections for respectively securing the connectors at the opposite ends of the metallic core to the shaft; each connection including a helical tension spring having one end attached to the connector of the associated end of the core and another end secured to the shaft such that the core is tensioned in its helical configuration abou the shaft; the support having an outer covering of a synthetic organic polymer that is stable at a sufficiently high temperature so as to be capable of supporting a hot glass sheet on the shaft upon cooling thereof at the quench unit; and the helical configuration of the support having an outer diameter equal to the diameter of the friction drive surfaces.

17. A quench roll as in claim 11, 12, 13, 14 15, or 16 wherein the covering of the helical support further includes an outer sleeve of ceramic fibers.

* * * * *